US012715174B2

(12) United States Patent
Morikawa

(10) Patent No.: US 12,715,174 B2
(45) Date of Patent: Aug. 25, 2026

(54) CAP DEVICE AND DISCHARGE DEVICE

(71) Applicant: FUJI CORPORATION, Chiryu (JP)

(72) Inventor: Shunji Morikawa, Toyoake (JP)

(73) Assignee: FUJI CORPORATION, Chiryu (JP)

( * ) Notice: Subject to any disclaimer, the term of this patent is extended or adjusted under 35 U.S.C. 154(b) by 203 days.

(21) Appl. No.: 18/700,049

(22) PCT Filed: Oct. 19, 2021

(86) PCT No.: PCT/JP2021/038621
§ 371 (c)(1),
(2) Date: Apr. 10, 2024

(87) PCT Pub. No.: WO2023/067698
PCT Pub. Date: Apr. 27, 2023

(65) Prior Publication Data
US 2025/0236069 A1 Jul. 24, 2025

(51) Int. Cl.
*B29C 64/209* (2017.01)
*B33Y 30/00* (2015.01)
*B41J 2/165* (2006.01)

(52) U.S. Cl.
CPC ......... *B29C 64/209* (2017.08); *B41J 2/16511* (2013.01); *B33Y 30/00* (2014.12)

(58) Field of Classification Search
CPC ................ B41J 2/16511; B41J 2/16505; B41J 2/16523; B41J 2/16547; B29C 64/209; B29C 64/20
See application file for complete search history.

(56) References Cited

U.S. PATENT DOCUMENTS 5,953,024 A * 9/1999 Lee ........................ B41J 19/205 347/23
2005/0001873 A1* 1/2005 Sugimura ............ B41J 2/16508 347/29
2011/0267399 A1* 11/2011 Ikeda .................. B41J 2/16511 347/29
2017/0313061 A1 11/2017 Profaca et al.
2017/0313084 A1* 11/2017 Profaca ................ B41J 2/16538
2020/0369032 A1* 11/2020 Morino ................ B41J 2/16508
2022/0063278 A1* 3/2022 Okeguchi ............ B41J 2/16552

FOREIGN PATENT DOCUMENTS

JP 2019-18408 A 2/2019

OTHER PUBLICATIONS

International Search Report issued Dec. 14, 2021 in PCT/JP2021/038621 filed on Oct. 19, 2021, 2 pages.

* cited by examiner

*Primary Examiner* — Galen H Hauth
*Assistant Examiner* — Mohamed K Ahmed Ali
(74) *Attorney, Agent, or Firm* — Oblon, McClelland, Maier & Neustadt, L.L.P.

(57) ABSTRACT

A cap device is used in a discharge device including a discharge head configured to discharge a liquid substance from a nozzle, and the cap device includes a wet cap body including a fixing portion configured to abut on the nozzle in a wet state and cap the nozzle, and a cap support section configured to position the wet cap body and detachably support the wet cap body.

12 Claims, 8 Drawing Sheets

Fig. 4
Fig. 4A
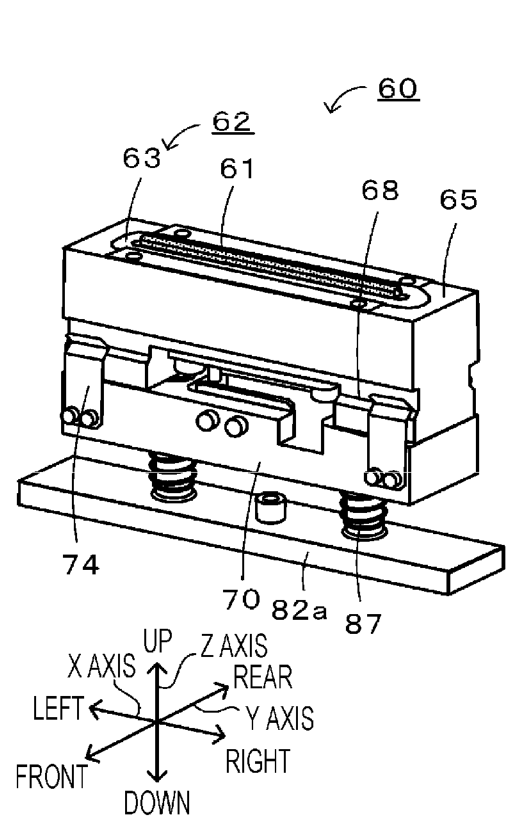
Fig. 4B
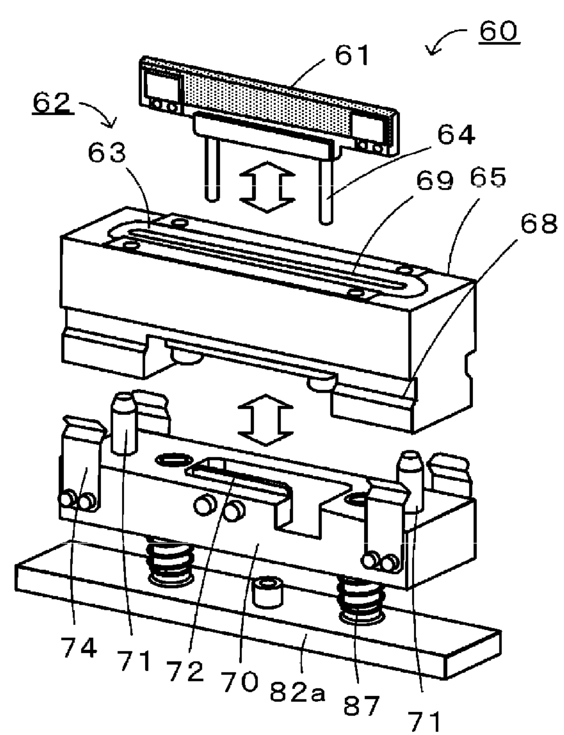

Fig. 5
Fig. 5A
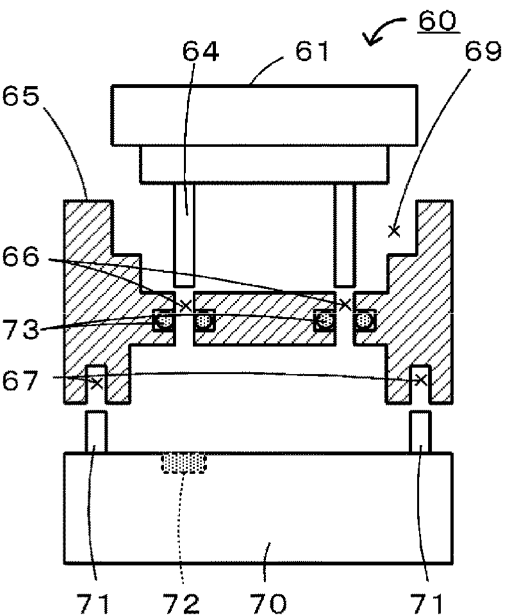
Fig. 5B
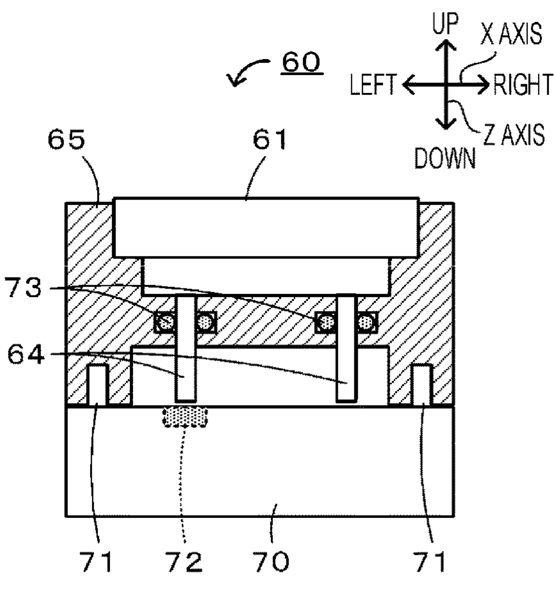
Fig. 5C
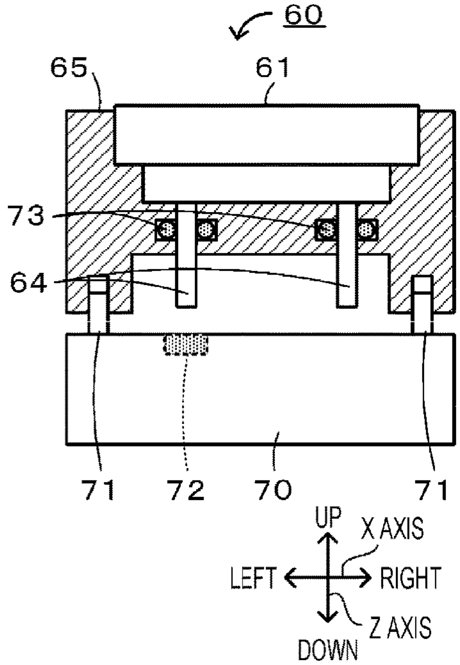
Fig. 5D
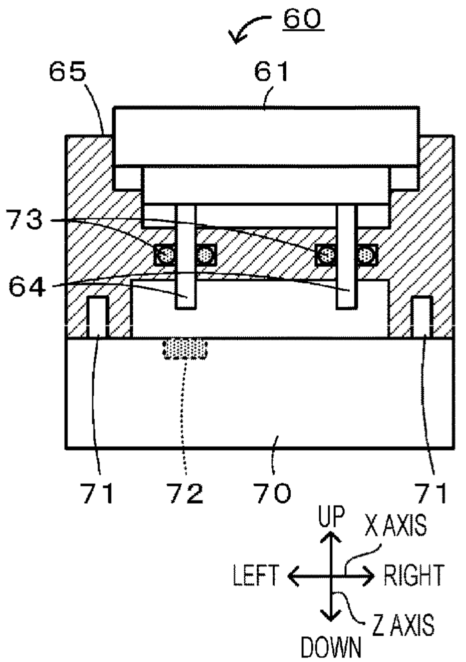

Fig. 6
Fig. 6A
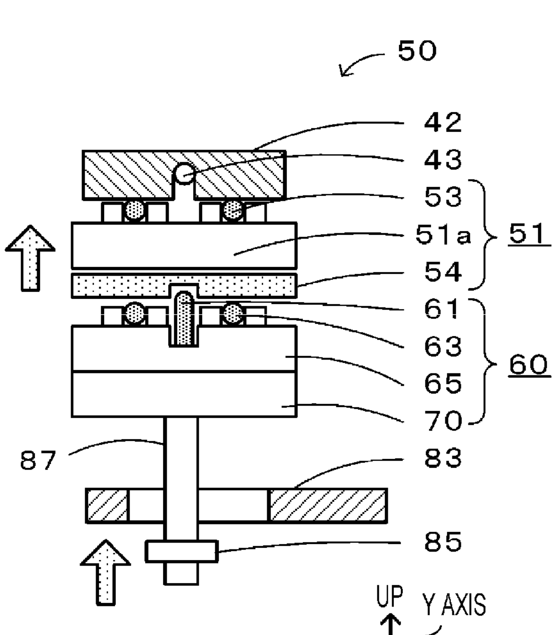
Fig. 6B
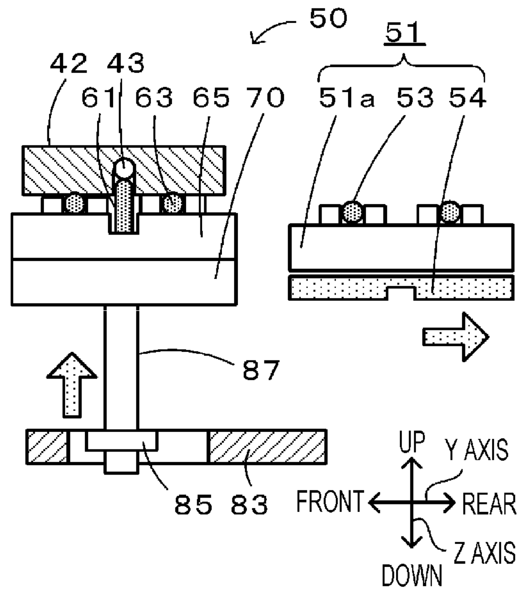
Fig. 6C
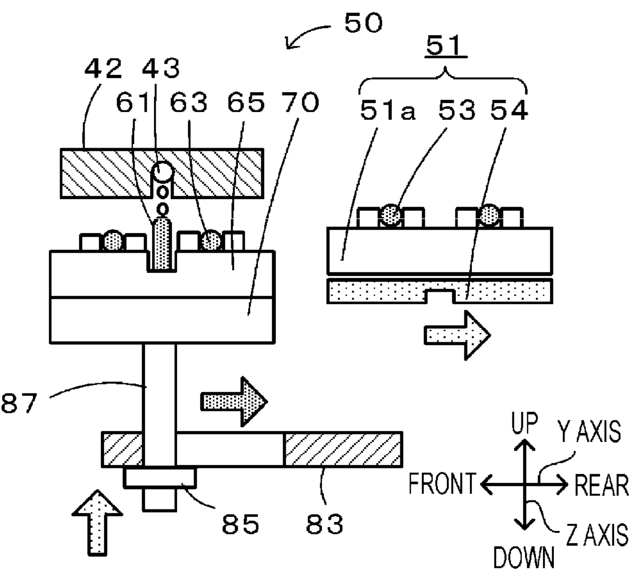

CAP DEVICE AND DISCHARGE DEVICE

TECHNICAL FIELD

The present description discloses a cap device and a discharge device.

BACKGROUND ART

Conventionally, for example, as a three-dimensional printer for discharging and solidifying a liquid, there has been proposed a discharge device including a discharge head for discharging a liquid containing a solvent from a nozzle surface, the discharge device includes a capping member for capping the nozzle surface of the discharge head and a wiping member for wiping the nozzle surface of the discharge head, the capping member can hold the solvent inside and/or on a surface thereof and caps the nozzle surface in a state of holding the solvent, and the wiping member can hold the solvent inside and/or on a surface thereof and wipes the nozzle surface in a state of holding the solvent (for example, refer to Patent Literature 1). In this device, a good discharge property can be obtained without performing purging, and a good nozzle surface and a good discharge state can be maintained for a long period of time even when the discharge liquid contains high-hardness fine particles.

PATENT LITERATURE

Patent Literature 1: JP-A-2019-18408

BRIEF SUMMARY

Technical Problem

However, in Patent Literature 1 described above, although it is considered that the state of the nozzle is maintained by the capping member, maintainability of the capping member is not considered, and it is required to further improve the maintainability. Further, when the maintenance of the cap device is not sufficiently performed, there is a problem that the nozzles cannot be managed in an appropriate state.

The present disclosure has been made in view of such a problem, and a main object thereof is to provide a cap device and a discharge device capable of further improving maintainability.

Solution to Problem

The cap device and the discharge device disclosed in the present description employ the following means in order to achieve the main object described above.

According to the present disclosure, there is provided a cap device used in a discharge device including a discharge head configured to discharge a liquid substance from a nozzle, the cap device including: a wet cap body including a fixing portion configured to abut on the nozzle in a wet state and configured to cap the nozzle: and a cap support section configured to position the wet cap body and detachably support the wet cap body.

In this cap device, the wet cap body can be removed from the cap support section, and a maintenance work of the wet cap body can be performed in the removed state. Accordingly, in the cap device, maintainability can be further improved. Further, in this cap device, by further improving the maintainability, the nozzle can be managed in a more appropriate state.

BRIEF DESCRIPTION OF DRAWINGS

FIG. 4 is a schematic view of wet cap section 60.

FIG. 5 is a diagram of an assembled state of wet cap section 60.

FIG. 6 is a diagram illustrating an example of the operation of cap device 50.

DESCRIPTION OF EMBODIMENTS

Figure 1:
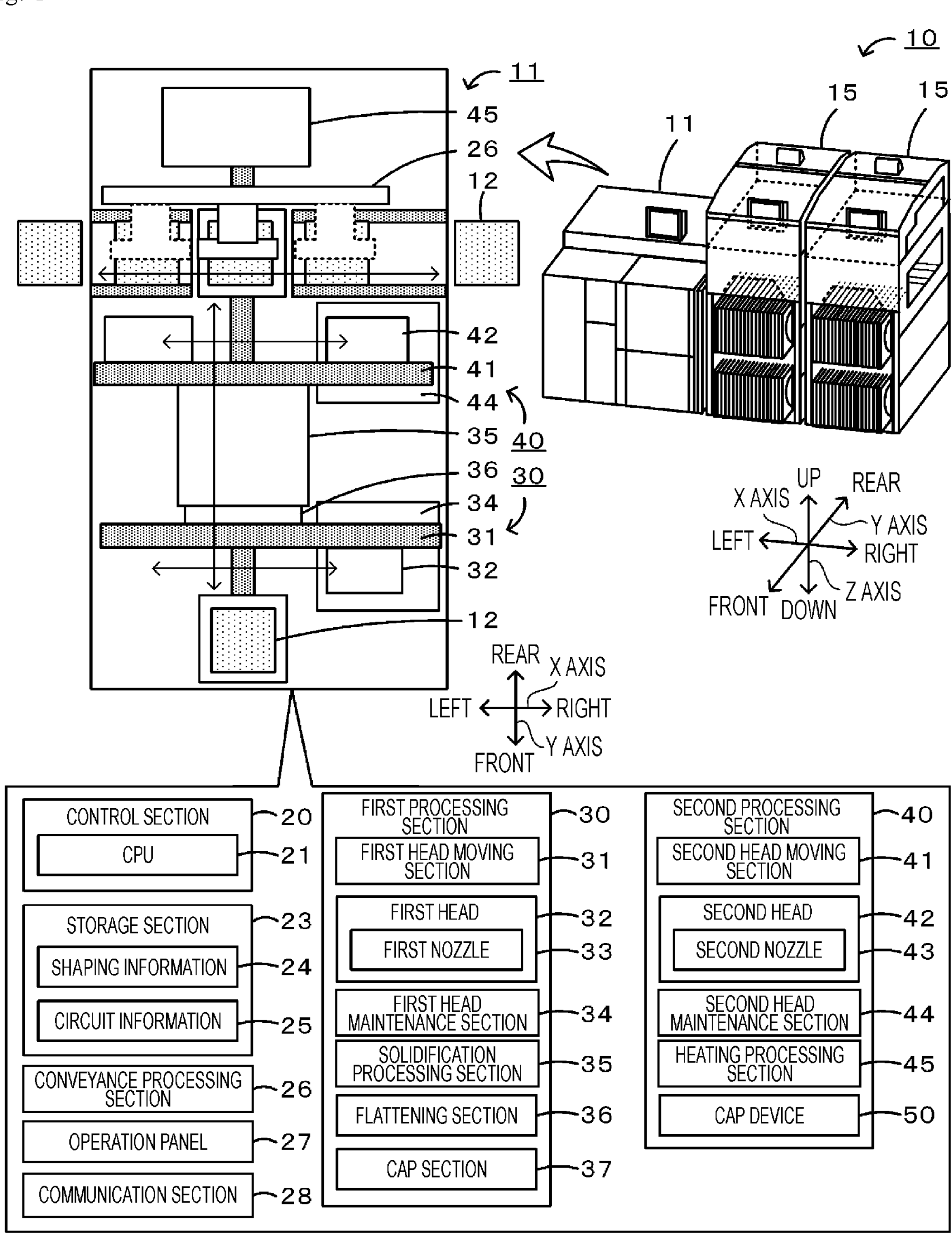
FIG. 1 is a schematic view illustrating an example of production system 10 and three-dimensional printer 11.
Figure 2:
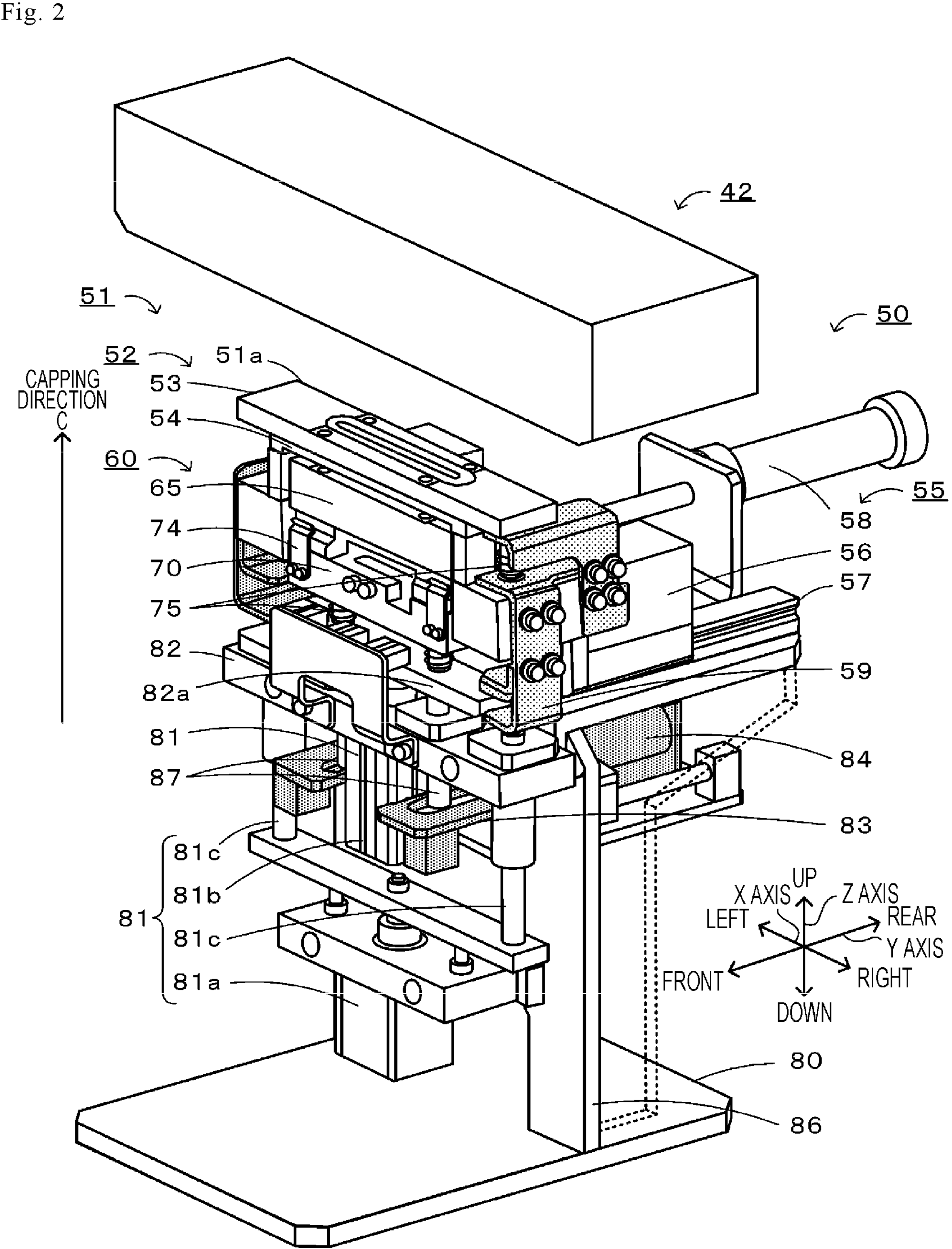
FIG. 2 is a schematic view of cap device 50 in a dry cap state.
Figure 3:
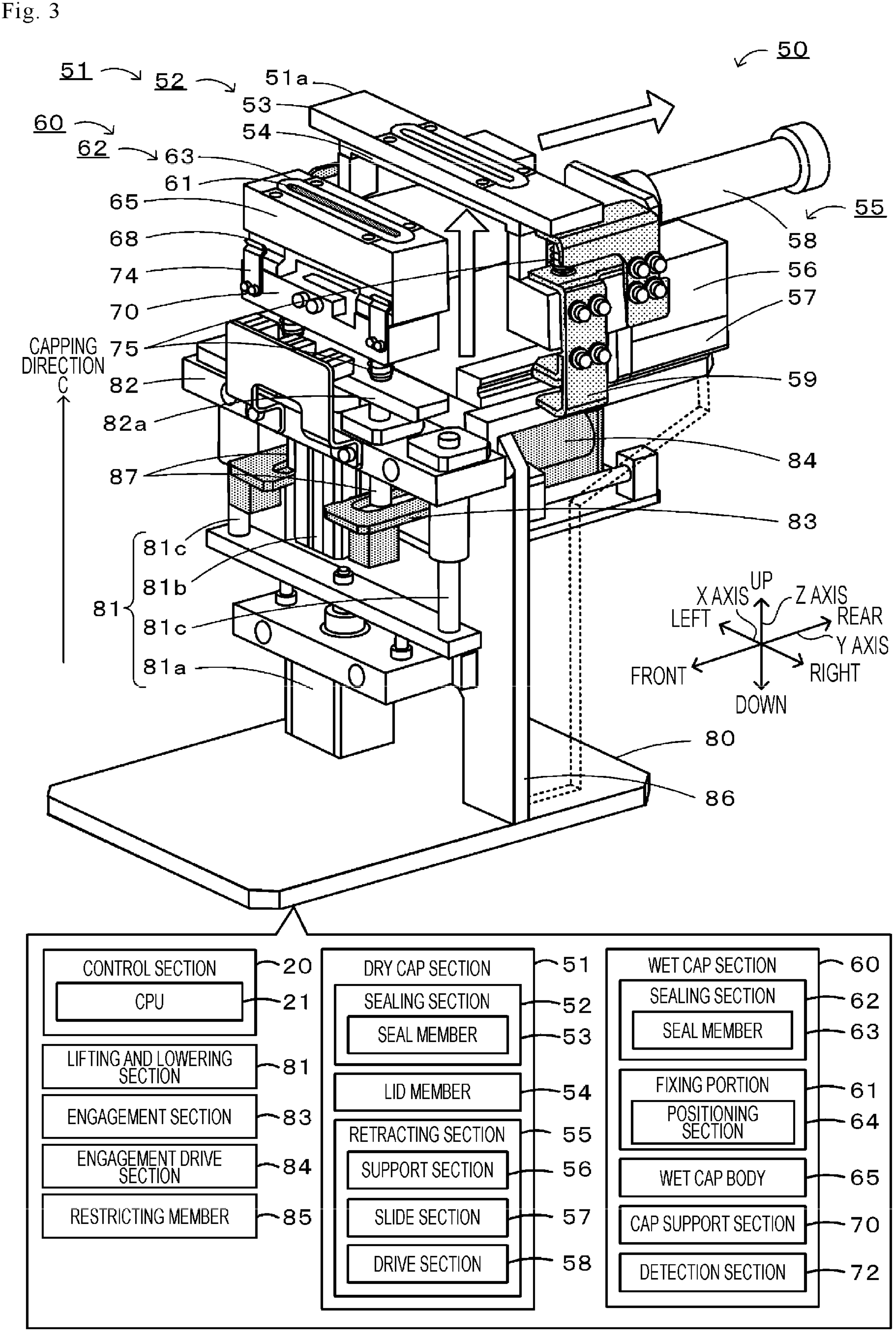
FIG. 3 is a schematic view of cap device 50 in a wet cap state.

Hereinafter, the present embodiment will be described with reference to drawings. FIG. 1 is a schematic diagram illustrating an example of production system 10 including three-dimensional printer 11 as an example of the present disclosure. FIG. 2 is a schematic view of cap device 50 in a dry cap state. FIG. 3 is a schematic view of cap device 50 in a wet cap state. FIG. 4 is a schematic views of wet cap section 60, in which FIG. 4A is an assembled state and FIG. 4B is an exploded perspective view. FIG. 5 is a view of an assembled state of wet cap section 60, in which FIG. 5A is an exploded view, FIG. 5B is a normal assembly view, FIG. 5C is a view in which assembling of wet cap body 65 is insufficient, and FIG. 5D is a view in which assembling of fixing portion 61 is insufficient. FIG. 6 is a diagram illustrating an example of the operation of cap device 50, in which FIG. 6A is a diagram in a dry cap state, FIG. 6B is a diagram in a wet cap state, and FIG. 6C is a diagram of an intermediate position. In the present embodiment, a left-right direction (X axis), a front-rear direction (Y axis), and an up-down direction (Z axis) are as illustrated in FIGS. 1 to 6.

Production system 10 is configured as a production line in which three-dimensional printer 11 shapes a three-dimensional object as a first process, forms a predetermined member on the three-dimensional object as a second process, and then mounting device 15 mounts a component. Three-dimensional printer 11 may form a circuit pattern as the second process, and mounting device 15 may execute a process of mounting a component at a predetermined position of the circuit pattern. Production system 10 may include only three-dimensional printer 11 without including mounting device 15, or may include, in addition to mounting device 15, one or more mounting-related devices among a printing device that prints solder as viscous fluid, a printing inspection device that inspects a printing result, a mounting inspection device that inspects a mounting result, a conveyance device that conveys a shaped three-dimensional object, a reflow device that performs a reflow process, and the like. Mounting device 15 is a device that mounts a component on a three-dimensional object shaped by three-dimensional printer 11.

Three-dimensional printer 11 is a device configured to shape a three-dimensional object. The material to be shaped is not particularly limited, and examples thereof include resins and ceramics. Three-dimensional printer 11 includes control section 20, storage section 23, conveyance processing section 26, operation panel 27, communication section 28, first processing section 30, and second processing section 40. Here, three-dimensional printer 11 will be described mainly on a configuration in which first processing section 30 shapes a three-dimensional object and second processing section 40 forms a circuit pattern on the shaped three-dimensional object.

Control section 20 is configured as a microprocessor centered on CPU 21, and controls entire three-dimensional printer 11. Control section 20 exchanges information with storage section 23, conveyance processing section 26, operation panel 27, communication section 28, first processing section 30, and second processing section 40. Storage section 23 is a large-capacity storage medium, and includes, for example, an HDD or a flash memory. Storage section 23 stores shaping information 24 and circuit information 25. Shaping information 24 includes information such as the shape and size of the three-dimensional object to be manufactured. Circuit information 25 includes information such as a circuit pattern formed in a three-dimensional object shape. Three-dimensional printer 11 executes work based on the information stored in storage section 23.

Conveyance processing section 26 moves and fixes pallet 12 on which a product is placed. As illustrated in FIG. 1, conveyance processing section 26 grips and moves pallet 12 in the X axis direction and moves pallet 12 in the Y axis direction along the guide. Conveyance processing section 26 scans pallet 12 in the Y axis direction also when the members are formed by first processing section 30 and second processing section 40.

Operation panel 27 is a unit that receives inputs from operator W and presents information to operator W. This operation panel 27 is disposed on a front surface of printing device 11 and includes a display section serving as a display and an operation section having a touch panel and buttons. Communication section 28 is an interface used when communicating with an external device such as mounting device 15 or a management device (not illustrated). Each device of production system 10 exchanges information via communication section 28.

First processing section 30 is a shaping unit that shapes a three-dimensional object by discharging a liquid substance to be solidified and then solidifying the liquid substance. First processing section 30 includes first head moving section 31, first head 32, first head maintenance section 34, solidification processing section 35, flattening section 36, and cap section 37. First head moving section 31 includes a slider moving by being guided by guide rails in the X axis direction, and a motor that drives the slider. First head 32 is mounted on the slider, and first head 32 moves along the X axis direction as the slider moves. First head 32 is a shaping head that discharges a liquid substance to shape a three-dimensional object. First nozzle 33 for discharging the liquid substance is formed on a lower surface of first head 32. Examples of the liquid substance discharged from first nozzle 33 include a liquid resin that is solidified by ultraviolet light, a slurry in which a solid material such as an inorganic material is mixed with a solvent, or the like.

First head maintenance section 34 is a unit that cleans first head 32. First head maintenance section 34 may include, for example, wiping paper as a cleaning member to wipe and clean the vicinity of first nozzle 33. First head maintenance section 34 appropriately performs a cleaning process periodically or according to a degree of contamination of first head 32. Solidification processing section 35 is a unit for performing a predetermined process on the liquid substance discharged onto pallet 12 and solidifying the liquid substance. When first head 32 discharges a liquid resin that is solidified by ultraviolet light, solidification processing section 35 is a unit that emits ultraviolet rays. When first head 32 discharges a liquid resin that is solidified by ultraviolet light, solidification processing section 35 is a unit that emits ultraviolet rays. When first head 32 discharges the liquid substance that is solidified by drying and firing, solidification processing section 35 may be a unit that performs drying and firing. In solidification processing section 35, each time one layer of the three-dimensional object is formed on pallet 12 by first head 32, pallet 12 is moved, and the three-dimensional object is accommodated and solidified. Flattening section 36 is a unit that flattens the liquid substance discharged onto pallet 12. For example, flattening section 36 may scan a flattening blade in the Y axis direction to flatten the outer shape of the discharge object. Cap section 37 is a unit that seals first nozzle 33 when first nozzle 33 is not used for a long period of time or when there is a predetermined blank time during the shaping. Cap section 37 is a dry cap mechanism in which a sealed space described later is not wet. For example, when first head 32 discharges a resin that is solidified by ultraviolet light, the resin is not solidified in the air and remains in a liquid state, and thus, when sealing first nozzle 33, it is sufficient by the dry cap. In a case where the liquid substance is a slurry in which a solid material is mixed with a solvent, first nozzle 33 may be clogged up due to dry-out of the liquid substance, and thus, cap section 37 is preferably configured similarly to a cap device 50 described later including a wet cap.

Second processing section 40 is a discharge unit that discharges the liquid substance to be solidified and then solidifies the liquid substance to form a predetermined material on the surface of the three-dimensional object. Second processing section 40 includes second head moving section 41, second head 42, second head maintenance section 44, heating processing section 45, and cap device 50. First head moving section 31 includes a slider moving by being guided by guide rails in the X axis direction, and a motor that drives the slider. Second head 42 is mounted on the slider, and second head 42 moves along the X axis direction as the slider moves. Second head 42 is a discharge head that discharges a liquid substance and forms a circuit pattern or the like. Second nozzle 43 for discharging the liquid substance is formed on the lower surface of second head 42. Examples of the liquid substance discharged from second nozzle 43 include a mixed liquid obtained by mixing a solid material in a solvent, a solution obtained by dissolving a resin in a solvent, or the like. Examples of the liquid substance for forming the circuit pattern include a mixed liquid in which metal powder as a conductive material is dispersed in an organic solvent, or the like.

Second head maintenance section 44 includes a mechanism similar to that of first head maintenance section 34, and a description thereof will be omitted. Heating processing section 45 is a unit that performs a process of drying the solvent contained in the liquid substance formed on the surface of the three-dimensional object. After all the circuit patterns are formed by second head 42, pallet 12 may be accommodated and dried in heating processing section 45, or pallet 12 may be accommodated and dried every time a part of the circuit patterns is formed by second head 42.

Cap device 50 is a device used in a discharge device including discharge heads that discharge a liquid substance from nozzles, for example, first head 32 and second head 42. Cap device 50 is a unit that seals second nozzle 43 when cap device 50 is not used for a long period of time or when there is a predetermined blank time during the formation of the circuit pattern. Cap device 50 is a device which includes dry cap section 51 that performs sealing for a short period and wet cap section 60 that prevents drying of second nozzle 43 by abutting wet fixing portion 61 on second nozzle 43, and causes different caps to be used depending on the situation. Cap device 50 is a device that seals second nozzle 43 of second head 42, and includes dry cap section 51, wet cap section 60, lifting and lowering section 81, and engagement section 83 as illustrated in FIGS. 2 and 3.

Dry cap section 51 is a unit that seals second nozzle 43 in order to prevent drying of second nozzle 43 of a short period. Dry cap section 51 is a mechanism that is disposed to overlap between second nozzle 43 and wet cap body 65 along capping direction C in which second nozzle 43 is capped, and caps second nozzle 43. Here, capping direction C is a direction along the Z axis direction. Since second head 42 does not have a moving mechanism in the Y axis direction or the Z axis direction, in cap device 50, dry cap section 51 and wet cap section 60 are lifted and lowered by lifting and lowering section 81 to abut on second head 42 and seal second head 42. Dry cap section 51 includes dry cap body 51*a*, sealing section 52, lid member 54, retracting section 55, and stopper 59. Dry cap section 51 includes no fixing portion 61 that keeps wet cap section 60 in the wet state.

Dry cap body 51*a* is a plate-shaped member and is disposed at the uppermost portion of the device. Sealing section 52 is formed on an upper surface of dry cap body 51*a*. Sealing section 52 is a portion configured to abut on and seal the vicinity of second nozzle 43. A groove-shaped space along the X axis direction is formed on the lower surface side of second nozzle 43, and second nozzle 43 is sealed when sealing section 52 abuts on the lower surface of second head 42. Seal member 53, which is a packing formed of an elastic body such as resin or rubber, is disposed at an edge portion of sealing section 52. Sealing section 52 is disposed on the upper surface of dry cap body 51*a* to be parallel to an abutment surface which is the lower surface side of second head 42.

Lid member 54 is a flat plate-shaped member disposed on the back side of dry cap body 51*a*, that is, on the lower surface side of sealing section 52. When wet cap section 60 is not in use, lid member 54 abuts on wet cap body 65 to close wet cap body 65. Lid member 54 moves together with dry cap body 51*a* along with the movement of dry cap body 51*a* by retracting section 55.

Retracting section 55 retracts dry cap section 51 in a direction different from capping direction C, for example, a direction intersecting capping direction C. Retracting section 55 moves dry cap section 51 in the Y axis direction orthogonal to the Z axis direction which is capping direction C. When dry cap section 51 is retracted to a retraction position (refer to FIG. 3) by retracting section 55, second nozzle 43 can be sealed by wet cap section 60. Retracting section 55 includes support section 56, slide section 57, and drive section 58. Support sections 56 are rectangular parallelepiped members disposed on the left and right sides of the device, and stays are disposed on the upper surface side. Dry cap body 51*a* is stretched over and fixed to the left and right stays. Support section 56 is slidably connected to slide section 57 fixed to intermediate support section 82, and slides in the Y axis direction integrally with dry cap body 51*a*. Drive section 58 moves support section 56 between a closed position (FIG. 2) and a retraction position (FIG. 3) of wet cap section 60 along the Y axis direction. Drive section 58 is an air cylinder, and moves dry cap section 51 by receiving pressure supply from a pressure supply section (not illustrated). Stopper 59 is disposed on support section 56. Stopper 59 is a C-shaped member fixed to the lower surface side of support section 56, and the plate-shaped body of intermediate support section 82 is inserted into the C-shaped space when support section 56 is in the closed position. Dry cap section 51 and wet cap section 60 are lifted and lowered integrally by stopper 59.

Wet cap section 60 is a unit that seals second nozzle 43 in order to prevent second nozzle 43 from drying during a relatively long period. Since wet cap section 60 seals fixing portion 61 in the wet state with fixing portion 61 abutting on second nozzle 43, it is possible to prevent drying of second nozzle 43 and nozzle clogging or the like caused by the drying. Wet cap section 60 is disposed immediately below dry cap section 51. Wet cap section 60 includes fixing portion 61, sealing section 62, wet cap body 65, cap support section 70, and detection section 72.

Fixing portion 61 is a thin plate-shaped member in the longitudinal direction (refer to FIG. 4) that abuts on second nozzle 43 to prevent drying of second nozzle 43 during the sealing of second nozzle 43. A cloth member that holds the liquid substance is fixed to an upper portion side of fixing portion 61. Fixing portion 61 is detached from wet cap body 65 by an operator in response to deterioration of the cloth member or the like, and is subjected to maintenance work such as exchange of the cloth member. Fixing portion 61 includes positioning section 64 that is detachably mounted on wet cap body 65 and that is positioned on wet cap body 65. Positioning section 64 is, for example, multiple rod-shaped members made of metal, and is disposed below fixing portion 61. Positioning section 64 is inserted to cap support section 70 side through passage opening 66 (refer to FIG. 5) of wet cap body 65. When positioning section 64 is inserted into passage opening 66, fixing portion 61 is positioned at a position abutting on second nozzle 43. As illustrated in FIG. 3, sealing section 62 is disposed on an upper surface of wet cap body 65, and seal member 63 similar to seal member 53 is disposed at an edge portion thereof. Note that sealing section 62 has the same configuration as sealing section 52, and description thereof is omitted.

Wet cap body 65 is a main body that includes fixing portion 61 abutting on second nozzle 43 in a wet state and caps second head 42. As illustrated in FIGS. 2 to 6, wet cap body 65 has a rectangular parallelepiped shape having left and right foot portions. Passage opening 66, positioning hole 67, groove portion 68, and insertion hole 69 are formed in wet cap body 65. Passage opening 66 is a through hole through which positioning section 64 is inserted and passed, and is used for positioning fixing portion 61. As illustrated in FIG. 5, seal member 73 into which positioning section 64 is inserted is disposed in passage opening 66 so that the liquid substance does not leak from wet cap body 65. Seal member 73 may be an O-ring formed of resin, rubber, or the like. Positioning hole 67 is a bottomed hole provided on the lower surface side of the foot portion of wet cap body 65 and positioning pin 71 disposed on the upper surface of cap support section 70 is inserted into positioning hole 67. Wet cap body 65 is positioned at an accurate sealing position by positioning hole 67 and positioning pin 71. Groove portion 68 is a groove formed on the front surface side and the rear surface side of the foot portion, and a bent portion of fixing holder 74 which is a leaf spring is fitted into groove portion 68. Groove portion 68 is used to fix wet cap body 65 and cap support section 70. Insertion hole 69 is a groove formed along the X axis direction and is a space into which fixing portion 61 is inserted. Passage opening 66 is formed in the lower surface of insertion hole 69.

Cap support section 70 is a member that positions wet cap body 65 and detachably supports wet cap body 65. As illustrated in FIG. 4, cap support section 70 is a rectangular parallelepiped member having a recess formed in the center, and is supported by intermediate support section 82 in a vertically movable state. Two intermediate shafts 87 are fixed to a lower surface side of cap support section 70. Intermediate shaft 87 passes through intermediate support section 82 and extends to pass through engagement section 83 disposed below. Restricting member 85, which is a portion that engages with engagement section 83, is fixed to the distal end of intermediate shaft 87 (refer to FIG. 6). Positioning pin 71 for positioning wet cap body 65 is erected on the upper surface of cap support section 70. Further, leaf spring shaped fixing holders 74 for fixing wet cap body 65 are disposed at four corners of cap support section 70. In wet cap section 60, wet cap body 65 can be removed in a state where fixing portion 61 is mounted, fixing portion 61 can be removed from removed wet cap body 65, and thus, it is easier for the operator to perform the maintenance work.

As illustrated in FIG. 5, detection section 72 for detecting the mounted state of fixing portion 61 and wet cap body 65 is disposed inside the upper surface side of cap support section 70. Detection section 72 detects the mounted state of fixing portion 61 and wet cap body 65 by detecting the distal end of positioning section 64 disposed in fixing portion 61. Detection section 72 may be a non-contact sensor or a contact sensor. Detection section 72 may be a metal detection sensor that detects metal in a non-contact manner. As illustrated in FIG. 5, the operator removes wet cap body 65 from cap support section 70, further removes fixing portion 61, and performs maintenance of fixing portion 61 (FIG. 5A). After completion of the maintenance work, the operator mounts fixing portion 61 on wet cap body 65 and mounts wet cap body 65 on cap support section 70. As illustrated in FIG. 5B, when fixing portion 61 and wet cap body 65 are normally mounted, since the distal end of positioning section 64 is positioned in the vicinity of detection section 72, detection section 72 can output a signal indicating that the mounted state is normal. Meanwhile, when the mounted state of fixing portion 61 is insufficient (FIG. 5C) or when the mounted state of wet cap body 65 is insufficient (FIG. 5D), detection section 72 cannot detect the distal end of positioning section 64, and thus cannot output a signal. As described above, in wet cap section 60, positioning section 64 disposed in fixing portion 61 passes through wet cap body 65 and reaches cap support section 70, and thus, the mounted states of fixing portion 61 and wet cap body 65 can be detected by limited detection section 72 without individually providing sensors for fixing portion 61 and wet cap body 65.

As illustrated in FIGS. 2 and 3, fixing base 80 is a member that disposes and supports each component of cap device 50. On fixing base 80, standing member 86 for supporting each component is erected. Intermediate support section 82 is fixed to standing member 86. Lifting and lowering section 81 is configured as a moving section that moves dry cap section 51, wet cap body 65, and second nozzle 43 are close to and separated from each other along capping direction C. Lifting and lowering section 81 includes first lifting and lowering section 81*a* and second lifting and lowering section 81*b*. First lifting and lowering section 81*a* is disposed on the lower side of standing member 86, and lifts and lowers moving shaft 81*c* via cylinders disposed on the left and right of intermediate support section 82. Moving shaft 81*c* pushes up dry cap section 51 and wet cap section 60 in capping direction C by pushing up stopper 59 from below when support section 56 is in the closed position (FIG. 2). Second lifting and lowering section 81*b* is disposed on the center side of standing member 86 and below intermediate support section 82. When support section 56 is at a retraction position (FIG. 3), second lifting and lowering section 81*b* pushes up plate member 82*a* above intermediate support section 82, thereby pushing up only wet cap section 60 in capping direction C. Cap device 50 is provided with spring 75 for adjusting the pressing force of dry cap body 51*a* and wet cap body 65. Lifting and lowering section 81 is not particularly limited as long as lifting and lowering section 81 is driven in one axial direction, and may include any of an air cylinder, a linear motor, and a ball screw mechanism, for example. Intermediate support section 82 is a support plate in which two plate-shaped members are arranged vertically. Plate member 82*a* disposed above intermediate support section 82 is supported by second lifting and lowering section 81*b* to be lifted and lowered.

Engagement section 83 is a member that moves between a predetermined engagement position and a predetermined passing position, engages with restricting member 85, which is a portion of intermediate shaft 87 disposed on wet cap body 65, at the engagement position, and fixes wet cap body 65 at an intermediate position (refer to FIG. 6C) close to second nozzle 43 without wet cap body 65 abutting on second nozzle 43. In cap device 50, when wet cap section 60 is located at the intermediate position, the process is performed to wet fixing portion 61 by discharging the liquid substance from second nozzle 43. Engagement section 83 is not limited to restricting member 85 as long as engagement section 83 fixes wet cap body 65 at the intermediate position, and may be configured to engage at least one portion of lifting and lowering section 81, wet cap body 65, or a member disposed thereon at the engagement position. Engagement section 83 is a member formed in a U-shape, and through grooves are formed on both distal end sides. As illustrated in FIG. 6, intermediate shaft 87 is inserted into the through groove. Engagement drive section 84 is fixed to standing member 86, and moves engagement section 83 between the engagement position and the passing position. Engagement drive section 84 moves engagement section 83 along the Y axis direction. Engagement drive section 84 is not particularly limited as long as engagement drive section 84 is driven in one axial direction, and may include any of an air cylinder, a linear motor, and a ball screw mechanism, for example.

Here, the operation of cap device 50 will be described with reference to FIG. 6. As illustrated in FIG. 6A, when second nozzle 43 is sealed by dry cap section 51, engagement section 83 is at the passing position. As illustrated in FIG. 6B, when second nozzle 43 is sealed by wet cap section 60, dry cap section 51 is located at the retraction position, engagement section 83 is located at the passing position, restricting member 85 passes through, and wet cap body 65 abuts on second head 42. Meanwhile, as illustrated in FIG. 6C, when wet cap body 65 is at the intermediate position, engagement section 83 moves to the locking position, and restricting member 85 engages with engagement section 83, whereby wet cap section 60 is fixed at the intermediate position.

First, the production process including the shaping process and the circuit pattern forming method of three-dimensional printer 11 configured as described above will be described. A production processing routine for performing this process is stored in storage section 23, and is executed after control section 20 inputs a production processing execution command from the operator. When the production processing routine starts, CPU 21 of control section 20 first performs a process of causing conveyance processing section 26 to convey pallet 12 to first processing section 30 to fix pallet 12. Next, CPU 21 causes first head 32 and conveyance processing section 26 to discharge the resin as a liquid substance onto pallet 12 to have a predetermined shape included in shaping information 24. Next, CPU 21 moves pallet 12 to solidification processing section 35 and solidifies the resin. The discharge process and the solidification process are repeated to shape a three-dimensional object. Next, pallet 12 placed on the shaped three-dimensional object is conveyed to second processing section 40. CPU 21 causes second head 42 and conveyance processing section 26 to discharge the liquid substance onto the shaped three-dimensional object based on the circuit pattern of circuit information 25. Subsequently, CPU 21 moves pallet 12 to heating processing section 45, and solidifies the liquid substance.

When the three-dimensional object on which the circuit pattern is formed is thus obtained, CPU 21 discharges pallet 12 to the outside of the device.

Figure 7:
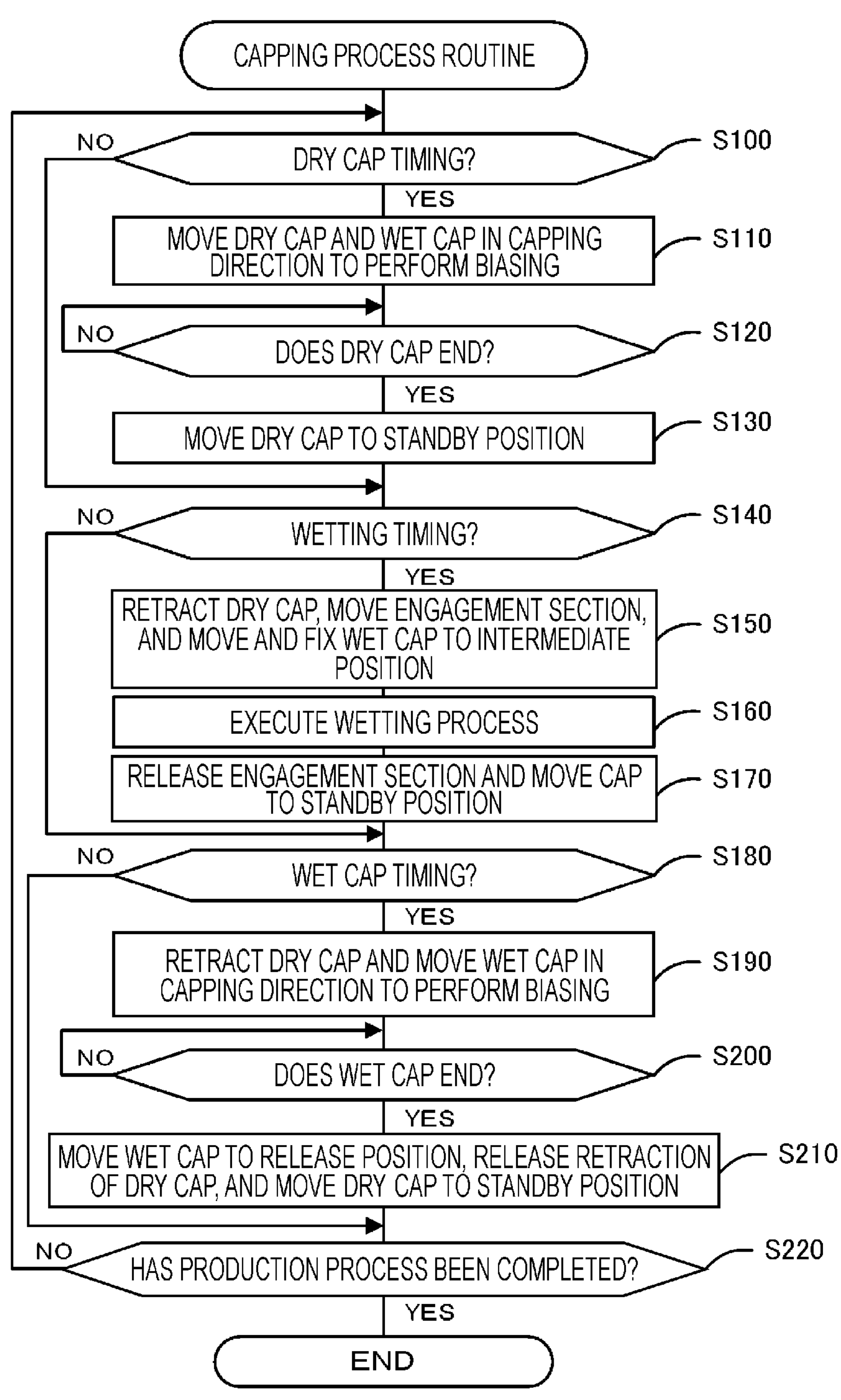
FIG. 7 is a flowchart illustrating an example of a capping process routine.

Next, the operation of cap device 50 will be described. FIG. 7 is a flowchart illustrating an example of a capping process routine executed by CPU 21 of control section 20. The routine is stored in storage section 23, and is performed after cap device 50 is activated. When this routine is executed, CPU 21 determines whether it is the dry cap timing of second nozzle 43 (S100). CPU 21 determines that it is the dry cap timing when second head 42 is not operated for a relatively short time such as 5 minutes. When it is the dry cap timing, CPU 21 moves dry cap section 51 and wet cap section 60 in capping direction C to bias dry cap body 51*a* so that dry cap body 51*a* presses second head 42, thereby sealing second nozzle 43 (S100, FIG. 6A). At this time, wet cap body 65 is sealed by lid member 54. Next, CPU 21 determines whether it is timing to end the dry cap based on the driving state of second head 42 (S120). When it is not the timing to end the dry cap, CPU 21 stands by as it is, and when it is the timing to end the dry cap, CPU 21 lowers dry cap section 51 and wet cap section 60 and moves them to the standby position (S130).

After S130 or when it is not the dry cap timing in S100, CPU 21 determines whether it is the wetting timing to wet fixing portion 61 (S140). The wetting timing can be defined by, for example, an elapsed time from the previous wetting process. When it is the wetting timing, CPU 21 moves and fixes wet cap body 65 to the intermediate position (S150). At this time, CPU 21 causes retracting section 55 to retract dry cap section 51 to the retraction position, and causes engagement drive section 84 to move engagement section 83 to the engagement position. Then, CPU 21 fixes wet cap body 65 at the intermediate position by engaging restricting member 85 with engagement section 83 when wet cap body 65 is lifted (FIG. 6C). Next, CPU 21 executes a wetting process (S160). In the wetting process, CPU 21 performs a process of discharging the liquid substance from second nozzle 43. In the wetting process, since cap device 50 cannot discharge the liquid substance from second nozzle 43 to fixing portion 61 in the wet cap state, cap device 50 fixes wet cap body 65 at the intermediate position and supplies the liquid substance to fixing portion 61. After S160, CPU 21 releases the retraction of dry cap section 51, moves engagement section 83 to the passing position, and moves dry cap section 51 and wet cap section 60 to the standby position (S170).

After S160 or when it is not the wetting timing in S140, CPU 21 determines whether it is the wet cap timing (S180). CPU 21 determines that it is the wet cap timing when second head 42 is not operated for a relatively long time such as 30 minutes or more. At the wet cap timing, CPU 21 retracts dry cap section 51 to the retraction position, moves wet cap section 60 in capping direction C to bias wet cap body 65 so that wet cap body 65 presses second head 42, thereby sealing second nozzle 43 (S190, FIG. 6B). Next, CPU 21 determines whether it is the timing to end the wet cap based on the driving state of second head 42 (S200). When it is not the timing to end the wet cap, CPU 21 stands by as it is, and when it reaches the timing to end the wet cap, CPU 21 releases the retraction of dry cap section 51, lowers dry cap section 51 together with wet cap section 60, and moves dry cap section 51 to the standby position (S210).

After S210 or when it is not the wet cap timing in S180, CPU 21 determines whether the production process has been completed (S220), and when the production process has not been completed, CPU 21 repeatedly executes the processes at step 100 and the subsequent steps. Conversely, when it is determined in S220 that the production process has been completed, CPU 21 ends this routine.

Figure 8:
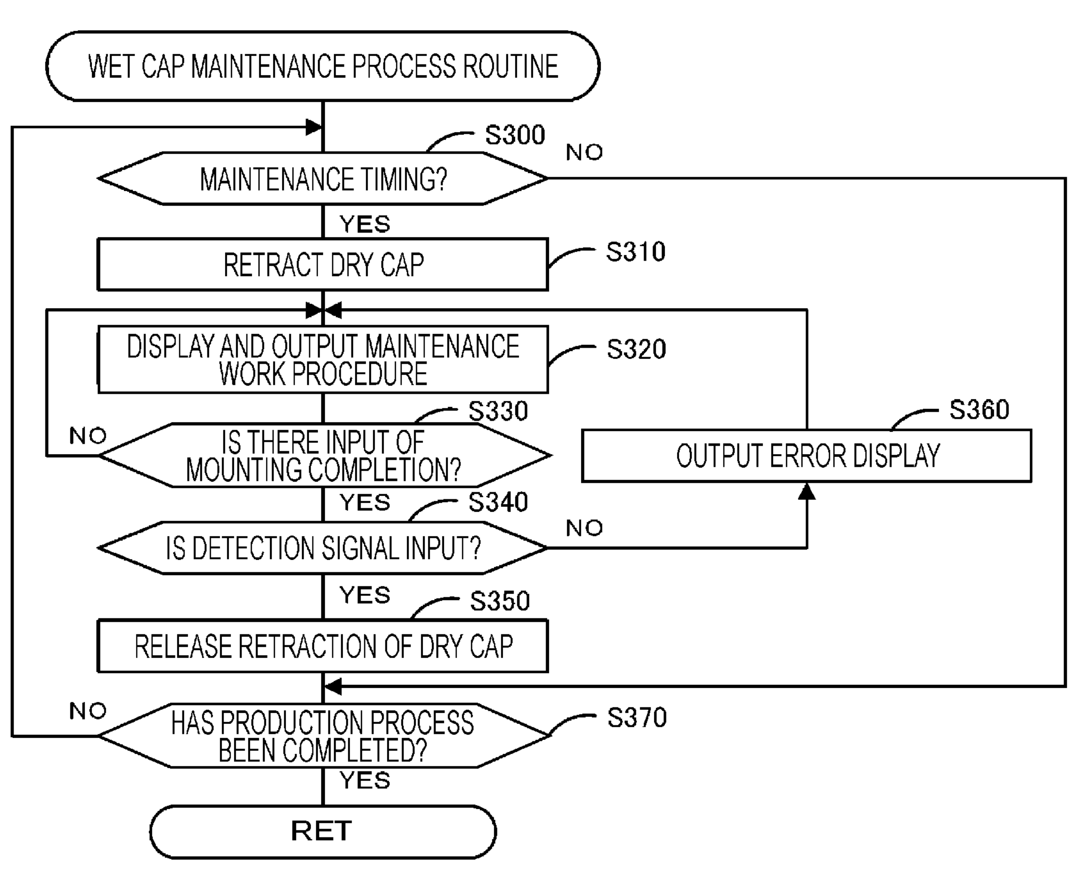
FIG. 8 is a flowchart illustrating an example of a wet cap maintenance process routine.

Next, a process of maintaining wet cap section 60 of cap device 50 while the production process of three-dimensional printer 11 is continued will be described. FIG. 8 is a flowchart illustrating an example of the wet cap maintenance process routine executed by CPU 21 of control section 20. The routine is stored in storage section 23, and is performed after cap device 50 is activated. When this routine is executed, CPU 21 determines whether it is the maintenance timing of wet cap section 60 (S300). CPU 21 determines that it is the maintenance timing when a predetermined period has elapsed from the previous maintenance. When it is the maintenance timing, CPU 21 causes retracting section 55 to retract dry cap section 51 to the retraction position (S310), and causes operation panel 27 to display and output the procedure of the maintenance work (S320). CPU 21, for example, displays and outputs the work of removing wet cap body 65 from cap support section 70, further removing fixing portion 61 from wet cap body 65, and exchanging fixing portion 61 as the work procedure. Further, CPU 21 displays and outputs the work of mounting fixing portion 61 on wet cap body 65 and mounting wet cap body 65 on cap support section 70 as the work procedure. The operator who has confirmed this executes the maintenance work according to the work procedure. For example, the operator mounts new fixing portion 61 on wet cap body 65 and mounts wet cap body 65 on cap support section 70. When fixing portion 61 has been exchanged, the operator inputs to operation panel 27 that the work has been completed.

Next, CPU 21 determines whether there is an input of mounting completion to operation panel 27 (S330), and when there is no input of mounting completion, the display output in S320 is continued. Meanwhile, when there is an input indicating that the mounting on operation panel 27 has been completed, CPU 21 determines whether a detection signal has been acquired from detection section 72 (S340). As illustrated in FIG. 5, detection section 72 outputs a detection signal when fixing portion 61 and wet cap body 65 are normally mounted (FIG. 5B), and does not output a detection signal when any one of fixing portion 61 and wet cap body 65 is not normally mounted (FIGS. 5C and 5D). In cap device 50, since wet cap body 65 and fixing portion 61 are detachable, such a mounted state is checked. When the detection signal from detection section 72 is acquired, CPU 21 releases the retraction of dry cap section 51 (S350), and returns to the normal production process. Meanwhile, when the detection signal from detection section 72 cannot be acquired, CPU 21 causes operation panel 27 to display and output an error screen indicating that the mounted state is not normal (S360), and executes the processes at S320 and the subsequent steps. That is, CPU 21 displays and outputs the maintenance work procedure. After confirming the error screen, the operator correctly mounts fixing portion 61 and wet cap body 65.

After S350 or when it is not the maintenance timing in S300, CPU 21 determines whether all the production processes of three-dimensional printer 11 are completed (S370), and when all the production processes are not completed, CPU 21 repeatedly executes the processes at S300 and the subsequent steps. Meanwhile, when it is determined in S370 that all the production processes have been completed, CPU 21 ends this routine.

Here, a correspondence relationship between the elements of the present embodiment and the elements of the present disclosure will be clarified. Second head 42 of the present embodiment corresponds to a discharge head, second nozzle 43 corresponds to a nozzle, wet cap body 65 corresponds to a wet cap body, cap support section 70 corresponds to a cap support section, fixing portion 61 corresponds to a fixing portion, positioning section 64 corresponds to a positioning section, detection section 72 corresponds to a detection section, and control section 20 corresponds to a control section. Further, passage opening 66 corresponds to a passage opening, seal member 73 corresponds to a seal member, dry cap section 51 corresponds to a dry cap section, lifting and lowering section 81 corresponds to a moving section, retracting section 55 corresponds to a retracting section, lid member 54 corresponds to a lid member, engagement section 83 corresponds to an engagement section, engagement drive section 84 corresponds to an engagement drive section, three-dimensional printer 11 corresponds to a discharge device, and cap device 50 corresponds to a cap device.

Cap device 50 of the present embodiment described above is used in three-dimensional printer 11 as a discharge device including second head 42 as a discharge head that discharges a liquid substance from second nozzle 43, and includes wet cap body 65 that has fixing portion 61 that abuts on second nozzle 43 in a wet state and caps second nozzle 43, and cap support section 70 that positions wet cap body 65 and detachably supports wet cap body 65. In cap device 50, wet cap body 65 can be removed from cap support section 70, and the maintenance work of wet cap body 65 can be performed in the removed state. Accordingly, cap device 50 can further improve the maintainability. In cap device 50, second nozzle 43 can be managed in a more appropriate state by further improving maintainability.

Fixing portion 61 includes positioning section 64 that is detachably mounted on wet cap body 65 and positioned in wet cap body 65. In cap device 50, fixing portion 61 can be removed from wet cap body 65, and the maintenance work of fixing portion 61 and wet cap body 65 can be performed in the removed state. Accordingly, cap device 50 can further improve the maintainability.

Cap device 50 further includes detection section 72 that detects the mounted state of wet cap 60. In cap device 50, it is possible to more appropriately detect a mounting failure or the like that may occur when wet cap body 65 is attached or detached. In cap device 50, second nozzle 43 can be managed in a more appropriate state by detecting the mounting failure. Further, fixing portion 61 includes positioning section 64 that is detachably mounted on wet cap body 65 and positioned in wet cap body 65, positioning section 64 is inserted into cap support section 70 side via wet cap body 65, and detection section 72 is disposed on cap support section 70 side and detects the mounted states of fixing portion 61 and wet cap body 65 by detecting the end portion of positioning section 64. In cap device 50, a member configured to determine the position of fixing portion 61 is used, and the mounting failures of fixing portion 61 and wet cap body 65 can be collectively detected by detection section 72. Therefore, in cap device 50, it is possible to more appropriately detect the mounting failure or the like that may occur when wet cap body 65 is attached or detached while further suppressing the complication of the configuration. In cap device 50, second nozzle 43 can be managed in a more appropriate state by detecting the mounting failure.

Furthermore, when the mounted state acquired from detection section 72 is not good, control section 20 displays and outputs information to that effect. In cap device 50, it is possible to more reliably notify of the mounting failure or the like based on the output information. Further, fixing portion 61 includes positioning section 64 which is detachably mounted on wet cap body 65 and is positioned in wet cap body 65, and wet cap body 65 is formed with passage opening 66 through which positioning section 64 passes, and seal member 73 into which positioning section 64 can be inserted and which is configured to prevent leakage of the liquid substance is disposed in passage opening 66. In cap device 50, fixing portion 61 is positioned, and seal member 73 can prevent leakage of the liquid substance.

Cap device 50 may include the dry cap section disposed to overlap between the nozzle and the wet cap body along the capping direction in which the nozzle is capped and configured to cap the nozzle, a moving section configured to move the dry cap section, the wet cap body, and the nozzle along the capping direction so that the dry cap section and the wet cap body are close to and separated from the nozzle, and the retracting section configured to retract the dry cap section in a direction different from the capping direction. Since the cap device includes the dry cap section and the wet cap body, the nozzle state can be more appropriately managed, for example, by using the dry cap section in a shorter pause period and by using the wet cap body by retracting the dry cap section in a longer pause period. Further, in the cap device, since the dry cap section and the wet cap body are disposed to overlap each other along the capping direction, a limited space can be more effectively used. Here, the "dry cap section" needs not include a fixing portion configured to abut on the nozzle. Further, the dry cap section and the wet cap body may be disposed such that the abutment surface to the discharge head is parallel to the nozzle surface. The capping direction may be the vertical direction. The retracting section may retract the dry cap section in a direction intersecting the capping direction.

In addition, cap device 50 includes wet cap body 65 that has fixing portion 61 that abuts on second nozzle 43 in the wet state and caps second nozzle 43, dry cap section 51 that is disposed to overlap between second nozzle 43 and wet cap body 65 along capping direction C in which second nozzle 43 is capped and caps second nozzle 43, lifting and lowering section 81 that moves dry cap section 51 and wet cap body 65 to be close to and separated from second nozzle 43 along capping direction C, and retracting section 55 that retracts dry cap section 51 in the direction different from capping direction C. Since cap device 50 includes dry cap section 51 and wet cap body 65, the state of second nozzle 43 can be managed more appropriately, for example, by using dry cap section 51 in a shorter pause period and by using wet cap body 65 by retracting dry cap section 51 in a longer pause period. Further, in cap device 50, since dry cap section 51 and wet cap body 65 are disposed to overlap each other along capping direction C, a limited space can be more effectively used.

In cap device 50, lid member 54 for closing wet cap body 65 is formed on the back side of dry cap section 51. In cap device 50, wet cap body 65 can be closed by lid member 54 to keep fixing portion 61 in the wet state. Further, since lid member 54 is retracted together with dry cap section 51 when wet cap body 65 is used, the configuration can be further simplified as compared with a case where the respective members are retracted separately. Further, cap device 50 includes engagement section 83 that moves between the predetermined engagement position and the predetermined passing position, engages with restricting member 85 disposed on wet cap body 65 at the engagement position, and fixes wet cap body 65 at the intermediate position close to second nozzle 43 without wet cap body 65 abutting on second nozzle 43, and engagement drive section 84 that moves engagement section 83 between the engagement position and the passing position. In cap device 50, wet cap body 65 can be fixed at the intermediate position by a relatively simple configuration and process by engagement section 83 and engagement drive section 84. Furthermore, in cap device 50, engagement section 83 is moved to the engagement position by engagement drive section 84 to fix wet cap body 65 at the intermediate position, and the liquid substance is supplied to fixing portion 61. In cap device 50, fixing portion 61 can be brought into a wet state at the intermediate position using a relatively simple configuration.

Further, three-dimensional printer 11 as the discharge device includes cap device 50 and second nozzle 43 as the discharge head that discharges the liquid substance from the nozzle. Since three-dimensional printer 11 includes cap device 50, it is possible to further improve maintainability. In addition, since maintainability of ones for shaping a three-dimensional object is improved in three-dimensional printer 11, it is possible to manage second nozzle 43 in a more appropriate state.

The cap device and the discharge device of the present disclosure are not limited to the embodiment that has been described heretofore, and hence, needless to say, the cap device and the discharge device can be carried out in various modes without departing from the technical scope of the present disclosure.

For example, in the above-described embodiment, cap device 50 includes detection section 72 that detects the distal end of positioning section 64, but detection section 72 is not particularly limited to this as long as it detects mounted states of fixing portion 61 and/or wet cap body 65. For example, detection section 72 may detect a portion other than positioning section 64, for example, the body of fixing portion 61 or wet cap body 65. At this time, positioning section 64 needs not penetrate wet cap body 65, passage opening 66 may be a bottomed hole, and seal member 73 may be omitted. Although wet cap body 65 requires multiple sensors, it is easy to prevent leakage of the liquid substance. Alternatively, in the above-described embodiment, detection section 72 is provided, but detection section 72 may be omitted. Further, control section 20 outputs the information of the mounting failure of fixing portion 61 or wet cap body 65, but this may be omitted. Also in cap device 50, since fixing portion 61 and wet cap body 65 can be removed, maintainability can be further improved.

In the above-described embodiment, cap device 50 includes dry cap section 51; however, the configuration is not limited to this, and dry cap section 51 may be omitted. Also in cap device 50, since fixing portion 61 and wet cap body 65 can be removed, maintainability can be further improved. In order to maintain wet cap section 60, for example, to reduce the frequency of opening wet cap section 60, dry cap section 51 is preferably provided.

In the above-described embodiment, dry cap section 51 and wet cap section 60 are disposed to overlap each other along capping direction C: however, the configuration is not particularly limited to this, and dry cap section 51 and wet cap section 60 may be disposed at different locations. Also in cap device 50, since fixing portion 61 and wet cap body 65 can be removed, maintainability can be further improved.

Alternatively, in the above-described embodiment, fixing portion 61 and wet cap body 65 are detachable, but fixing portion 61 and wet cap body 65 needs not be detachable if dry cap section 51 and wet cap section 60 are disposed to overlap each other along capping direction C and dry cap section 51 is retracted by retracting section 55. Since cap device 50 includes dry cap section 51 and wet cap body 65, the nozzle state can be managed more appropriately, for example, dry cap section 51 is used in a shorter pause period, dry cap section 51 is retracted and wet cap body 65 is used in a longer pause period. Further, in cap device 50, since dry cap section 51 and wet cap body 65 are disposed to overlap each other along capping direction C, a limited space can be more effectively used.

In the above-described embodiment, cap device 50 includes engagement section 83 that engages with restricting member 85 and engagement drive section 84; however, the configuration is not particularly limited to this, as long as wet cap body 65 is fixed at the intermediate position, and other mechanisms such as a lifting and lowering mechanism that lifted and lowered in two steps may be adopted. Alternatively, in cap device 50, engagement section 83, engagement drive section 84, and the like may be omitted, and fixing at the intermediate position may be omitted. In this case, cap device 50 may include another mechanism for wetting fixing portion 61.

In the embodiment described above, control section 20 executes the wetting process in which wet cap body 65 is fixed at the intermediate position and the liquid substance is discharged from second nozzle 43 to wet fixing portion 61: however, the configuration is not particularly limited to this, and a wetting process different from the above-described wetting process may be executed. Alternatively, control section 20 may omit the wetting process.

In the above-described embodiment, second processing section 40 forming the circuit pattern includes cap device 50 including dry cap section 51 and wet cap section 60; however, the configuration is not particularly limited to this, and first processing section 30 that performs the shaping process may include cap device 50 that includes dry cap section 51 and wet cap section 60. In cap device 50, since fixing portion 61 and wet cap body 65 can be removed from first processing section 30, maintainability can be further improved.

In the above-described embodiment, three-dimensional printer 11 including cap device 50 has been described: however, the configuration is not particularly limited this, and only cap device 50 may be provided. In three-dimensional printer 11 described above, control section 20 performs the shaping process, the circuit pattern forming process, and the capping process: however, the configuration is not particularly limited to this, and a dedicated control section in which cap device 50 executes capping process may be provided.

The discharge device of the present disclosure may be configured as follows. For example, the cap device of the present disclosure is a cap device used in a discharge device including a discharge head configured to discharge a liquid substance from a nozzle, the cap device may include a wet cap body including a fixing portion configured to abut on the nozzle in a wet state and configured to cap the nozzle, a dry cap section disposed to overlap between the nozzle and the wet cap body along a capping direction in which the nozzle is capped and configured to cap the nozzle, a moving section configured to move the dry cap section, the wet cap body, and the nozzle along the capping direction so that the dry cap section and the wet cap body are close to and separated from the nozzle, and a retracting section configured to retract the dry cap section in a direction different from the capping direction.

Since the cap device includes the dry cap section and the wet cap body, the nozzle state can be more appropriately managed, for example, by using the dry cap section in a shorter pause period and by using the wet cap body by retracting the dry cap section in a longer pause period. Further, in the cap device, since the dry cap section and the wet cap body are disposed to overlap each other along the capping direction, a limited space can be more effectively used. Here, the "dry cap section" needs not include a fixing portion configured to abut on the nozzle. Further, the dry cap section and the wet cap body may be disposed such that the abutment surface to the discharge head is parallel to the nozzle surface. The capping direction may be the vertical direction. The retracting section may retract the dry cap section in a direction intersecting the capping direction.

INDUSTRIAL APPLICABILITY

The present disclosure can be used in the technical field of a device for producing a product by discharging a liquid substance.

REFERENCE SIGNS LIST

10: production system, 11: three-dimensional printer, 12: pallet, 15: mounting device, 20: control section, 21: CPU, 23: storage section, 24: shaping information, 25: circuit information, 26: conveyance processing section, 27: operation panel, 28: communication section, 30: first processing section, 31: first head moving section, 32: first head, 33: first nozzle, 34: first head maintenance section, 35: solidification processing section, 36: flattening section, 37: cap section, 40: second processing section, 41: second head moving section, 42: second head, 43: second nozzle, 44: second head maintenance section, 45: heating processing section, 50: cap device, 51: dry cap section, 51*a*: dry cap body, 52: sealing section, 53: seal member, 54: lid member, 55: retracting section, 56: support section, 57: slide section, 58: drive section, 59: stopper, 60: wet cap section, 61: fixing portion, 62: sealing section, 63: seal member, 64: positioning section, 65: wet cap body, 66: passage opening, 67: positioning hole, 68: groove portion, 69: insertion hole, 70: cap support section, 71: positioning pin, 72: detection section, 73: seal member, 74: fixing holder, 75: spring, 80: fixing base, 81: lifting and lowering section (moving section), 81*a*: first lifting and lowering section, 81*b*: second lifting and lowering section, 81*c*: moving shaft, 82: intermediate support section. 82*a*: plate member. 83: engagement section. 84: engagement drive section. 85: restricting member. 86: standing member. 87: intermediate shaft. C: capping direction.

The invention claimed is:

1. A cap device used in a discharge device including a discharge head configured to discharge a liquid substance from a nozzle, the cap device comprising:

a wet cap body including a fixing portion configured to abut on the nozzle in a wet state, the wet cap body being configured to cap the nozzle;

a dry cap section disposed to overlap between the nozzle and the wet cap body along a capping direction in which the nozzle is capped, the dry cap section being configured to cap the nozzle;

a retracting section configured to retract the dry cap section in a direction different from a capping direction; and a cap support section configured to position the wet cap body and detachably support the wet cap body.

2. The cap device according to claim 1, wherein the fixing portion includes a positioning section detachably mounted on the wet cap body and positioned in the wet cap body.

3. The cap device according to claim 1, further comprising:

a detection section configured to detect a mounted state of the wet cap body.

4. The cap device according to claim 3, wherein the fixing portion includes a positioning section detachably mounted on the wet cap body and positioned in the wet cap body, the positioning section is configured to be inserted into a side of the cap support section via the wet cap body, and the detection section is disposed on a side of the cap support section, the detection section being configured to detect a mounted state of the fixing portion and the wet cap body by detecting the positioning section.

5. The cap device according to claim 1, wherein the fixing portion includes a positioning section detachably mounted on the wet cap body and positioned in the wet cap body, and the wet cap body is formed with a passage opening through which the positioning section passes, and a seal member, into which the positioning section can be inserted and which is configured to prevent leakage of the liquid substance, is disposed in the passage opening.

6. The cap device according to claim 1, further comprising:

a moving section configured to move the dry cap section, the wet cap body, and the nozzle along the capping direction so that the dry cap section and the wet cap body are close to and separated from the nozzle.

7. A cap device used in a discharge device including a discharge head configured to discharge a liquid substance from a nozzle, the cap device comprising:

a wet cap body including a fixing portion configured to abut on the nozzle in a wet state, the wet cap body being configured to cap the nozzle;

a dry cap section disposed to overlap between the nozzle and the wet cap body along a capping direction in which the nozzle is capped, the dry cap section being configured to cap the nozzle;

a moving section configured to move the dry cap section, the wet cap body, and the nozzle along the capping direction so that the dry cap section and the wet cap body are close to and separated from the nozzle; and a retracting section configured to retract the dry cap section in a direction different from the capping direction.

8. The cap device according to claim 6, wherein a lid member is formed on a back side of the dry cap section, the lid member being configured to close the wet cap body.

9. The cap device according to claim 1, further comprising:

an engagement section configured to move between a engagement position and a passing position, the engagement section being configured to engage with at least one of a moving section or the wet cap body at the engagement position to fix the wet cap body at an intermediate position that does not abut on the nozzle and is close to the nozzle; and an engagement drive section configured to move the engagement section between the engagement position and the passing position.

10. The cap device according to claim 9, further comprising:

a control section configured to cause the engagement drive section to move the engagement section to the engagement position to fix the wet cap body at the intermediate position, and supply the liquid substance to the fixing portion.

11. A discharge device comprising:

the cap device according to claim 1; and a discharge head configured to discharge a liquid substance from a nozzle.

12. The discharge device according to claim 11, wherein the discharge device is a three-dimensional printer configured to shape a three-dimensional object.

* * * * *